US006732471B2

(12) United States Patent
Draper (10) Patent No.: US 6,732,471 B2
(45) Date of Patent: May 11, 2004

(54) TRAP

(75) Inventor: Roy Alan Draper, Belgrave South (AU)

(73) Assignee: Ecotrap Pty. Ltd., Victoria (AU)

( * ) Notice: Subject to any disclaimer, the term of this patent is extended or adjusted under 35 U.S.C. 154(b) by 0 days.

(21) Appl. No.: 10/221,611

(22) PCT Filed: Mar. 15, 2001

(86) PCT No.: PCT/AU01/00293

§ 371 (c)(1),
(2), (4) Date: Sep. 13, 2002

(87) PCT Pub. No.: WO01/67858

PCT Pub. Date: Sep. 20, 2001

(65) Prior Publication Data

US 2003/0014902 A1 Jan. 23, 2003

(30) Foreign Application Priority Data

Mar. 15, 2000 (AU) .............................. PQ6245

(51) Int. Cl.[7] .............................. A01M 23/02
(52) U.S. Cl. .............................. 43/62; 43/60
(58) Field of Search ....................... 43/60–62

(56) References Cited

U.S. PATENT DOCUMENTS

| | | | |
|---|---|---|---|
| 102,761 A | 5/1870 | Brooks | |
| 411,606 A | 9/1889 | Parker | |
| 433,241 A | 7/1890 | Hawkins | |
| 874,654 A | * 12/1907 | Beaudry | ........................ 43/62 |
| 1,075,954 A | 10/1913 | Verner | |
| 1,425,355 A | * 8/1922 | Yamasaki | ...................... 43/62 |
| 1,576,707 A | 3/1926 | Bailey | |
| 1,612,608 A | 12/1926 | Chamberlin | |
| 1,881,530 A | 10/1932 | Hancock | |
| 3,596,395 A | 8/1971 | Clement | |
| 3,903,637 A | * 9/1975 | Dorsey | ........................ 43/105 |
| 4,791,753 A | 12/1988 | Fuhrman | |
| 5,966,862 A | * 10/1999 | Ueno | ............................ 43/63 |

* cited by examiner

Primary Examiner—Charles T. Jordan
Assistant Examiner—Bret Hayes
(74) Attorney, Agent, or Firm—Michael Best & Friedrich LLP (57) ABSTRACT

Animal trap (10) comprises at least one base member (12) for contact with ground, at least one frame member (18) pivotally arranged with respect to at least one base member (12) and release mechanism (30) for holding, in use, at least one frame member (18) under tension above ground. Netting (54) attached to at least one frame member (18) so that when release mechanism (30) is tripped by animal (56) entering trap (10), at least one frame member (18) pulls netting (54) over animal (56) as at least one frame member (18) falls to ground when tension is released.

8 Claims, 13 Drawing Sheets

TRAP

This invention relates to an animal trap and relates particularly, though not exclusively, to an animal trap which does not result in damage to the animal when trapped.

Prior art animal traps are generally based on the closing jaw principle where a set of opposing jaws, when tripped, move towards one another to clamp the animal's leg therebetween. The jaws usually have teeth on the sides to bite into the flesh of the animal to prevent escape. The trap is fastened to the ground with a chain and the animal can thrash about trying to remove the trap from its leg. Such traps are cruel as animals may break a leg, or bleed to death, until the hunter returns to check the traps. Unfortunately, traps do not distinguish between pests, harmless wildlife and even humans. Although the traps may be set for rabbits or foxes, it is likely that harmless native wildlife or a human being may trip the trap.

It is an object of the present invention to provide an animal trap which does not rely on the clamping to a limb to capture the animal.

A further object of the invention is to provide an animal trap which causes less stress to the captured animal and reduces the risk of damage to the animal.

With these and other objects in view the present invention provides an animal trap including at least one base member for providing contact of said trap with the ground, at least one frame member arranged with respect to said at least one base member, a release mechanism for holding, in use, said at least one frame member under tension above the ground and netting attached to said at least one frame member whereby, in use, when said release mechanism is tripped by an animal entering said trap, said at least one tensioned frame member pulls said netting over said animal as said at least one frame member falls to the ground when said tension is released.

Preferably said at least one frame member is a loop which lies on the ground in its released position and where a portion thereof is held above the ground when under tension. In one practical embodiment a rod is coiled to form a pair of substantially co-axial loops where the free ends of said rod are adjacent each other whereby one loop forms said at least one base member and the other loop forms said at least one frame member. Preferably one of said free ends is pivotally attached to a frame element secured to said one loop and the other of said free ends is secured to said frame element.

In a further practical embodiment a rod is coiled to form a pair of substantially co-axial loops where the free ends of said rod are adjacent each other on opposing sides of said coiled rod whereby a part of each loop forms a pair of base members and the other part of each loop forms a pair of frame members.

In order that the invention may be more readily understood and put into practical effect, reference will now be made to the accompanying drawings, in which.

In the drawings a first embodiment is shown in FIGS. 1 to 8 which shows an animal trap 10 having a base member 12 formed from an arcuate frame element 14 and a circular base 16. Although an arcuate frame element 14 is shown in this embodiment the shape, orientation, etc can be varied to suit requirements e.g. V-shaped. Arcuate frame element 14 and/or circular base 16 can be pegged (not shown) to the ground to ensure the animal trap 10 cannot be moved or tipped over. Circular base 16 is formed from a length of coiled rod to form two loops 16 and 18, best seen in FIG. 3. One end 20 is fastened e.g. by welding to arcuate frame element 14 at 22. The coiled rod is also fastened at 24 to arcuate frame element 14. The other end of the coiled rod has a bearing sleeve 26 which slides over free end 28 of arcuate frame element 14 to form a pivot for loop 18. The coiled rod and arcuate frame element 14 are preferably formed of steel rod but could be made from any suitable material that can be flexed e.g. fibreglass.

In order to set the animal trap a release mechanism 30 is needed. In the embodiment shown release mechanism 30 has a plate 32 which is secured across frame element 14 and circular base 16 by U-shaped brackets 34 and bolts 36. A plunger 38 in the shape of an L-shaped rod is adapted to slide in apertures of upstanding brackets 40 attached to plate 32. Plunger 38 is biased by spring 42 to move between the positions shown in FIGS. 6 and 8. Tensioning of spring 42 is by a slidable tiltable lock washer 44 which are commonly used to hold open hydraulic struts typically used in fly wire doors. A pin 46 acts as a stop when setting the trap.

To complete release mechanism 30, a cable 48 is provided which has a loop 50 at one end for engagement with plunger 38. At the other end there is a further loop or sling 52 which slides along loop 18. Loosely fitting netting 54 is attached to loop 18 to prevent escape of animal 56 when trap 10 has been tripped.

Figure 1:
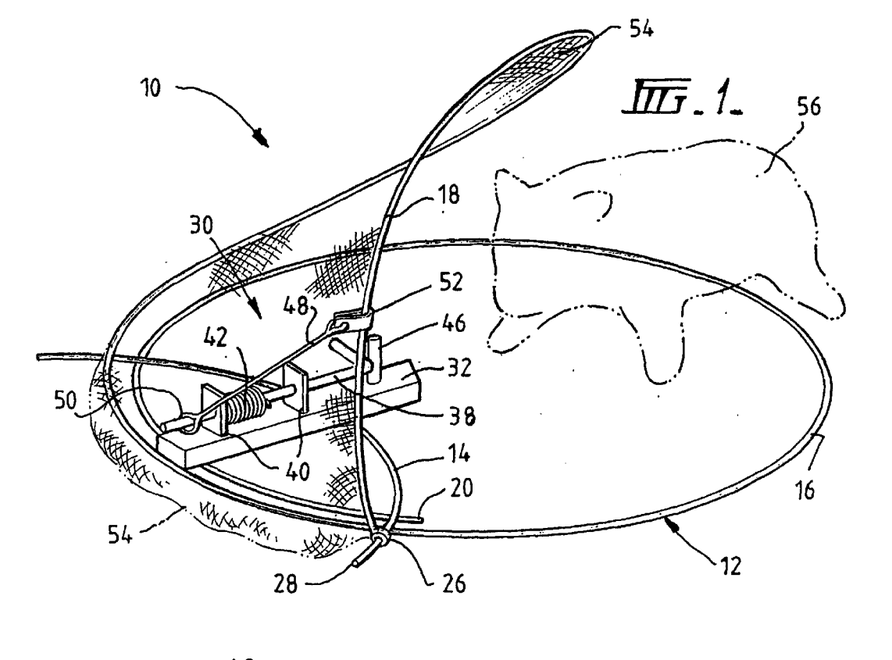
FIG. 1 is a perspective view of a first embodiment of an animal trap made in accordance with the invention with the trap being set.
Figure 2:
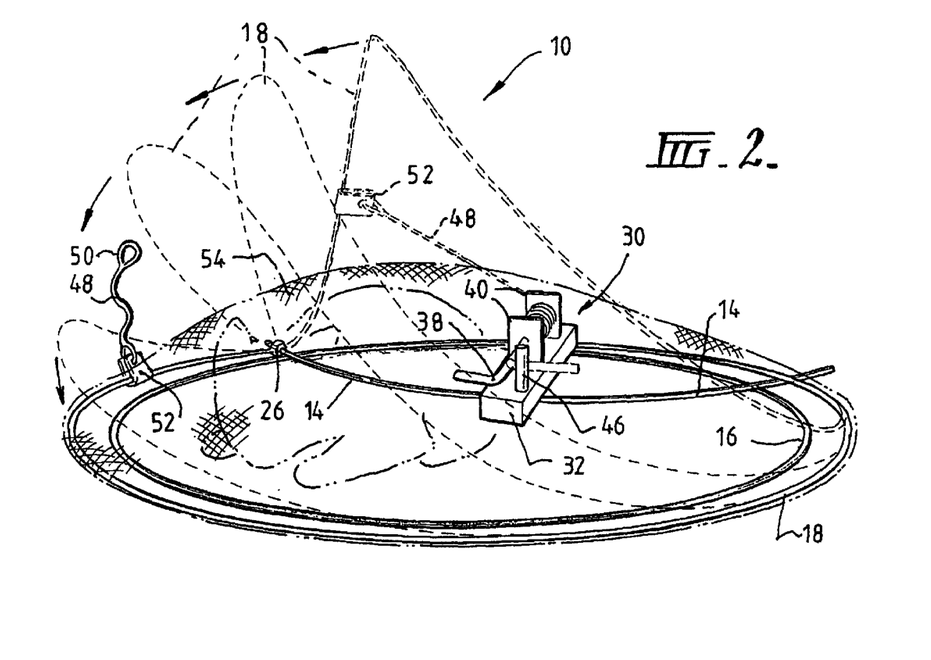
FIG. 2 is an end view of the animal trap shown in FIG. 1 showing the trap in the tripped position.
Figure 3:
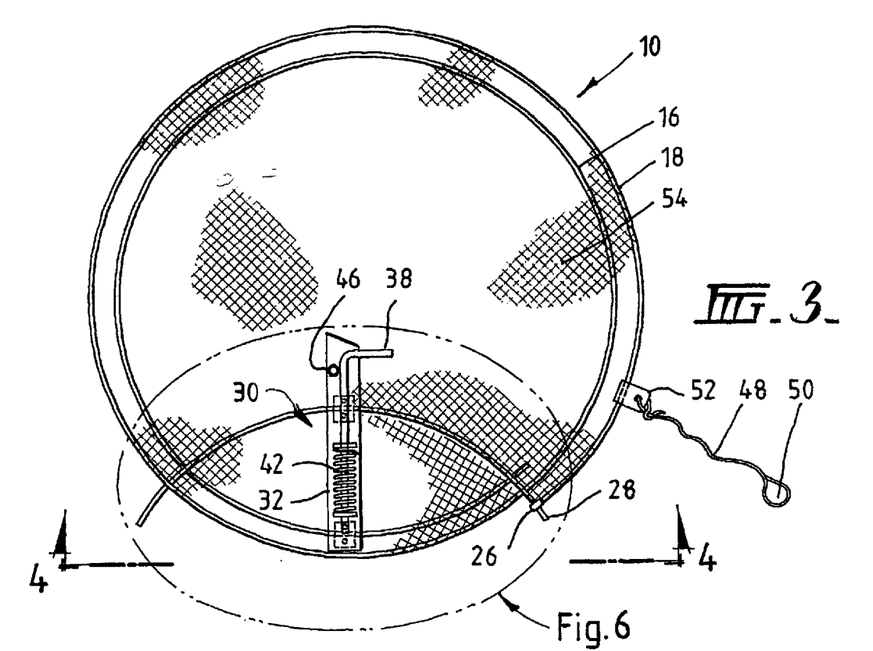
FIG. 3 is a top view of the animal trap shown in FIG. 2.
Figures 4, 6, 7:
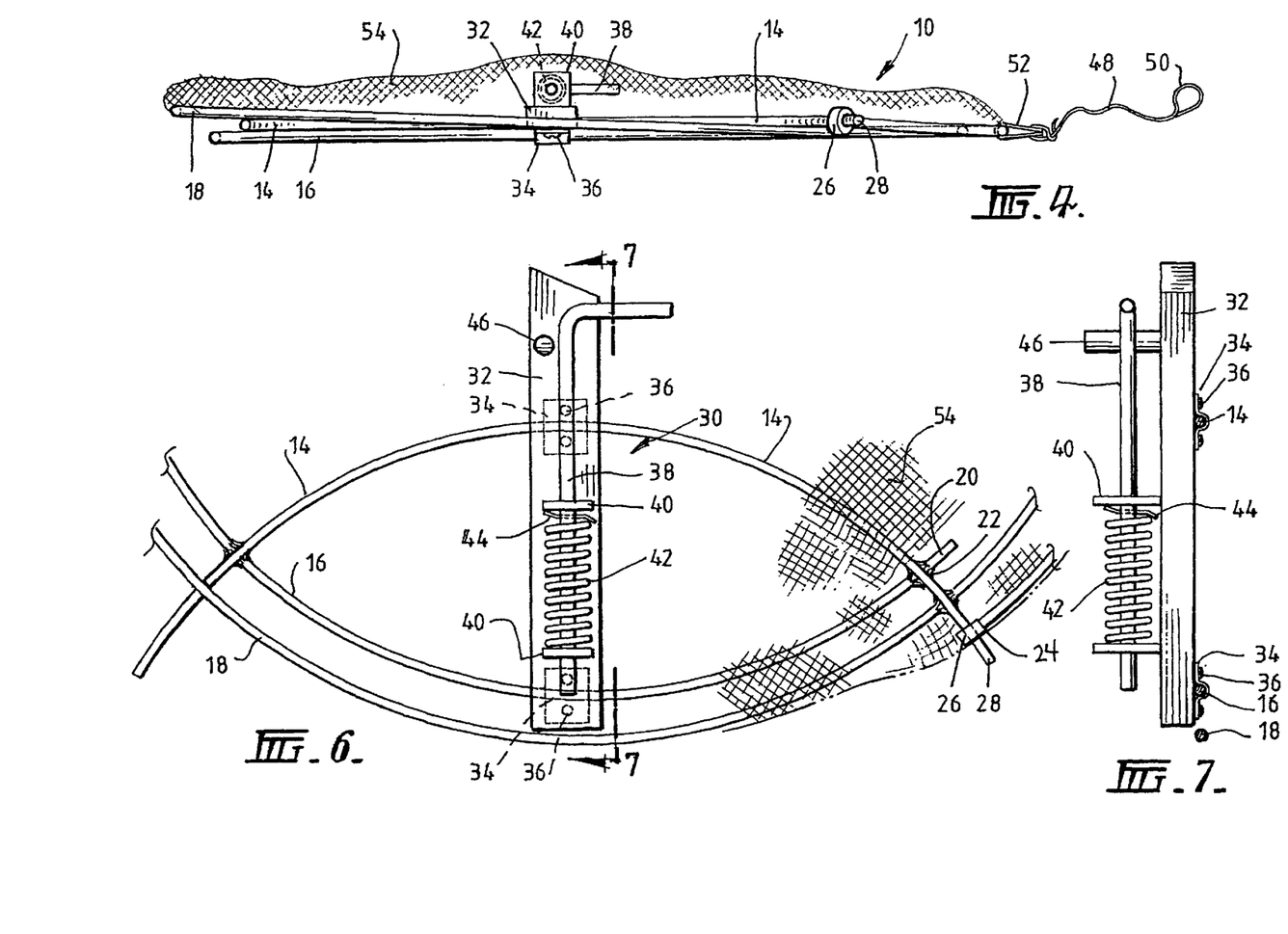
FIG. 4 is a cross-sectional view along and in the direction of arrows 4—4 shown in FIG. 3.
FIG. 6 is an enlarged view of the area indicated in FIG. 3.
FIG. 7 is a cross-sectional view along and in the direction of arrows 7—7 shown in FIG. 6.
Figure 5:
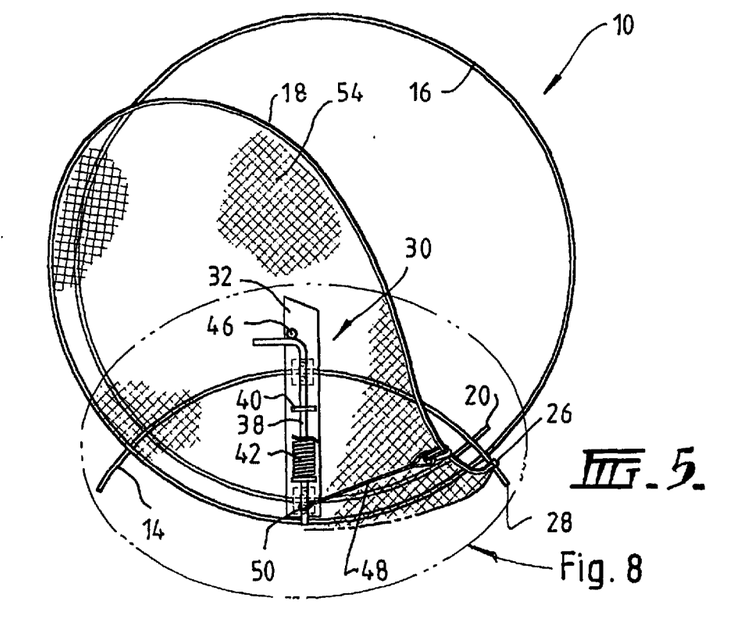
FIG. 5 is a top view of the animal trap shown in FIG. 1.
Figure 8:
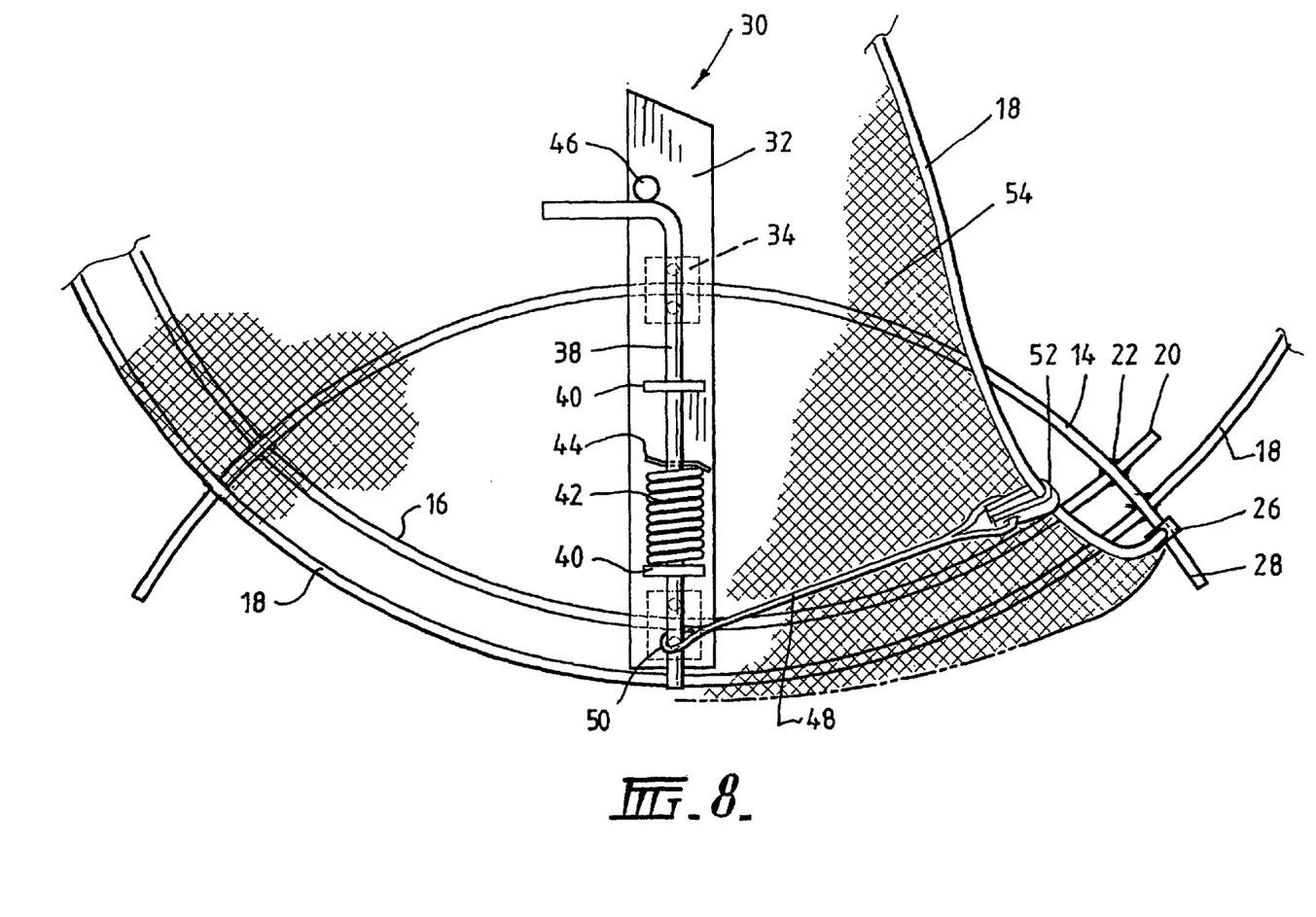
FIG. 8 is an enlarged view of the area indicated in FIG. 5.
Figure 9:
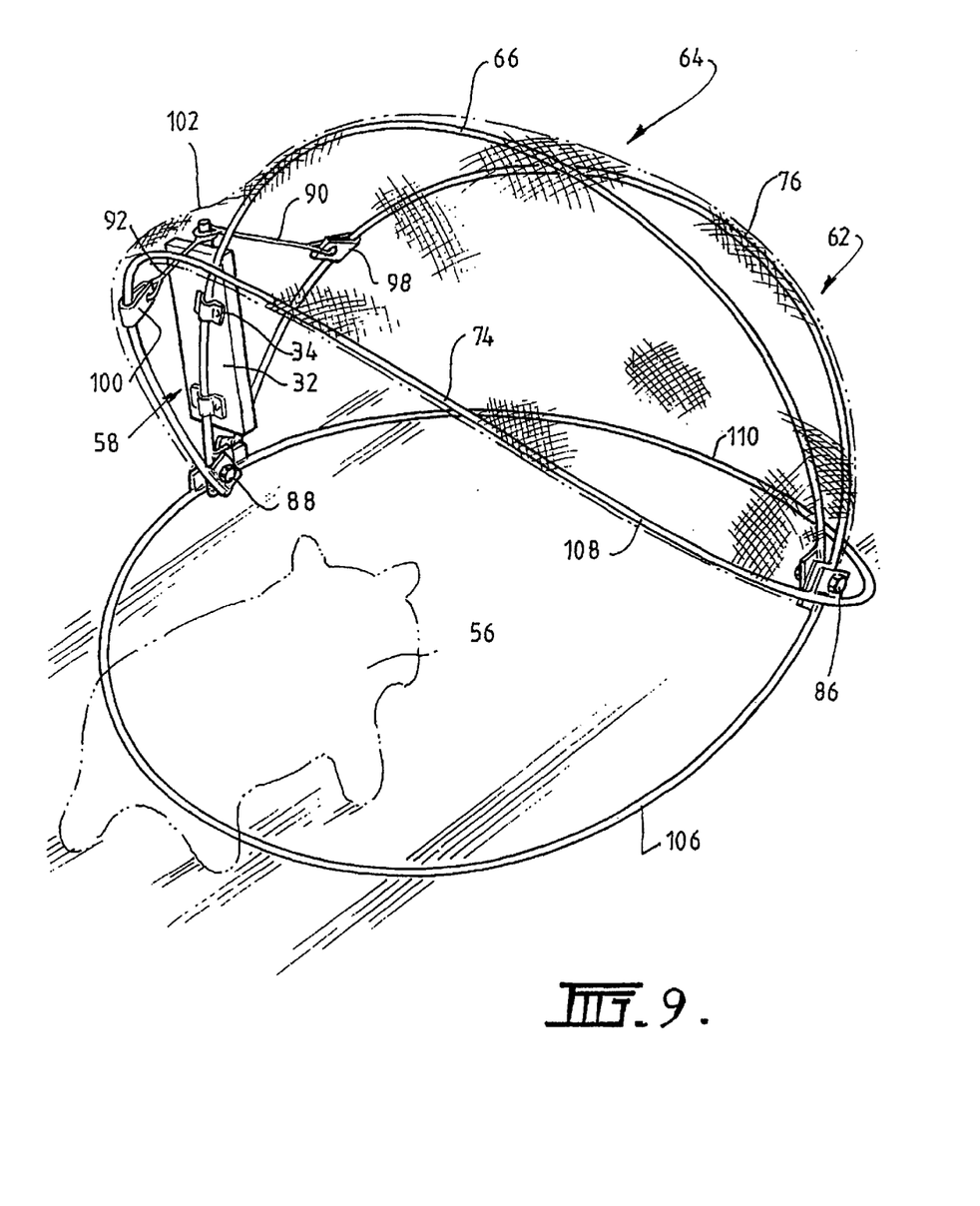
FIG. 9 is a perspective view of a second embodiment of an animal trap made in accordance with the invention with the trap being set.

In use, animal trap 10 comes as a flat package when stored as seen in FIG. 6. The package is light in weight and many traps can be carried to a site if needed. The trap 10 is set up as shown in FIG. 3 with loops 16,18 lying on the ground. Loop or circular base 16 is preferably held to the ground by stakes or other similar device to ensure that the trapped animal does not escape by lifting loop 16. Frame element 14 may also be staked to the ground. In order to set the trap L-shaped plunger 38 is moved to the position shown in FIGS. 1 and 5 to rest against 46 and spring 42 is tensioned by shifting washer 44 along plunger 38 and engaging washer 44 against plunger 38. Loop 18 is then bent upwards to pivot about free end 28 of frame element 14 as seen in FIGS. 1 and 5. Loop 18 will be under tension and can be held in the position shown in FIGS. 1 and 5 by locating loop 50 over the end of plunger 38. A bait (not shown) is linked to plunger 38 for the animal to take. The plunger 38 will, when tugged, unbalance washer 44 to release spring 42 and cause plunger 38 to rotate and move to the position shown in FIGS. 3 and 5. Loop 50 will be freed from plunger 38 causing loop 18 to instantly be forced to the ground under the previously held tension. The sequence of this operation is shown in phantom lines in FIG. 2. As netting 54 is attached to loop 18 the netting will fall over animal 56 trapping the animal underneath. As the animal cannot push loop 18 upwards due to the required tension, the animal remains trapped in the netting 54. As no jaws are used, the animal will not suffer injury from being trapped in this manner.

A second embodiment of the invention is shown in FIGS. 9 to 14. In this embodiment the release mechanism 58 is the same as that used in relation to the embodiment shown in FIGS. 1 to 8 and the same reference numerals will be used to avoid repetition of description. In this embodiment animal 56 has two entrances 60,62 in which to enter trap 64. Trap 64 uses the tensioned loop principle depicted in the embodiment shown in FIGS. 1 to 8. A half loop 66 has apertured tabs 68, 69 at each end which allow half loop 66 to stand up from the ground as shown in FIGS. 9, 10, 12 and 14. Again a coiled rod 70 (best seen in FIGS. 11 and 12 ) is used to form two loops 74,76 in a similar manner to loops 16,18 in FIGS. 1 to 8. The difference is that apertured tabs 78,80 are provided at the free ends of coiled rod 70 and a further set of apertured tabs 82,84 are provided on rod 70 diametrically opposite to apertured tabs 78,80. An additional tab 79 is also on rod 70 and is positioned between tabs 68,78. In use, tabs 82,84 and 69 are pivotally attached together by bolt 86 whilst tabs 80,68,79 and 78 are pivotally attached together by bolt 88.

Release mechanism 58 is secured to half loop 66 and will not be further described. To complete release mechanism 58 two cables 90,92 are provided which have respective loops 94,96 at one end for engagement with plunger 38. At the respective ends there are further loops or slings 98,100 which slide along loop 76,74 respectively. Loosely fitting netting 102 is attached to loops 76,74 and sits on half loop 66 to prevent escape of animal 56 when the trap has been tripped.

Figure 10:
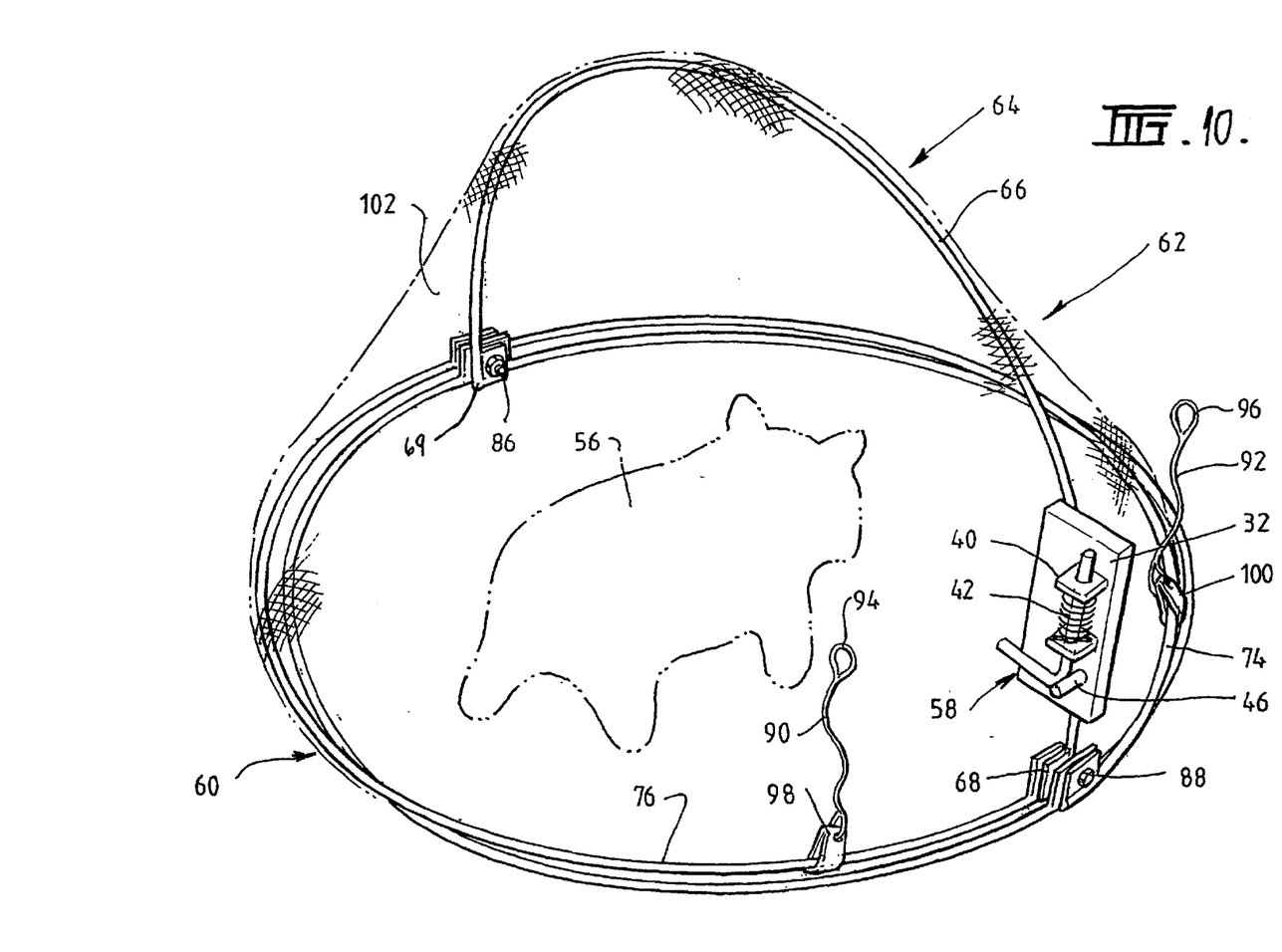
FIG. 10 is an end view of the animal trap shown in FIG. 9 showing the trap in the tripped position.
Figure 11:
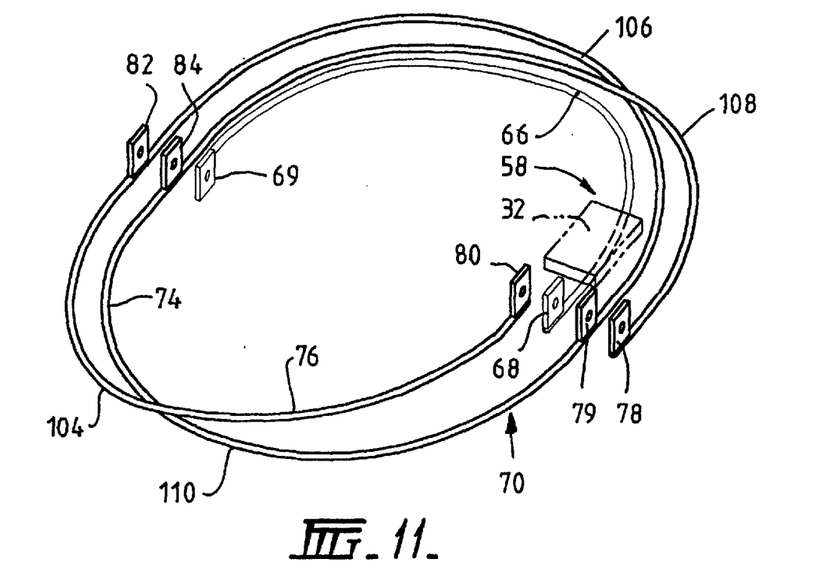
FIG. 11 is an exploded view of the components of the animal trap shown in FIG. 9 in the collapsed position.
Figure 12:
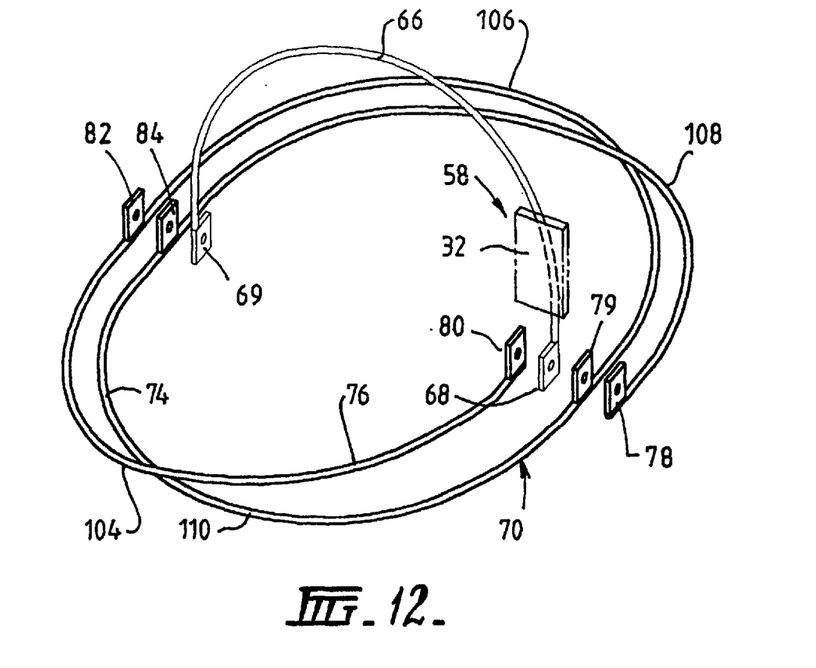
FIG. 12 is an exploded view of the components of the animal trap shown in the position shown in FIG. 10.
Figure 13:
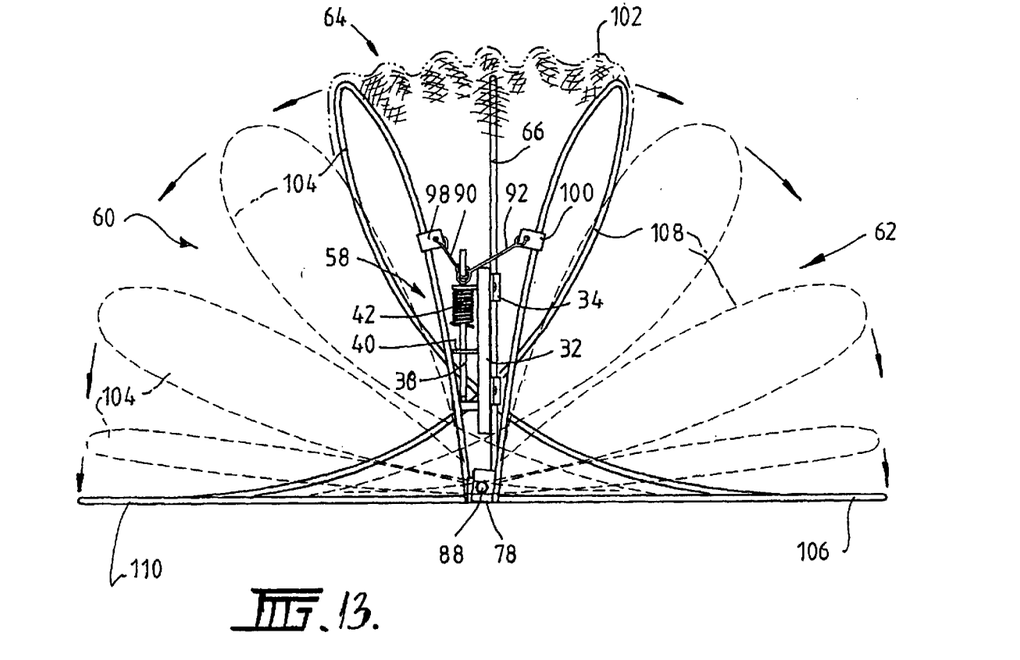
FIG. 13 is a side view of the animal trap shown in FIG. 9.
Figure 14:
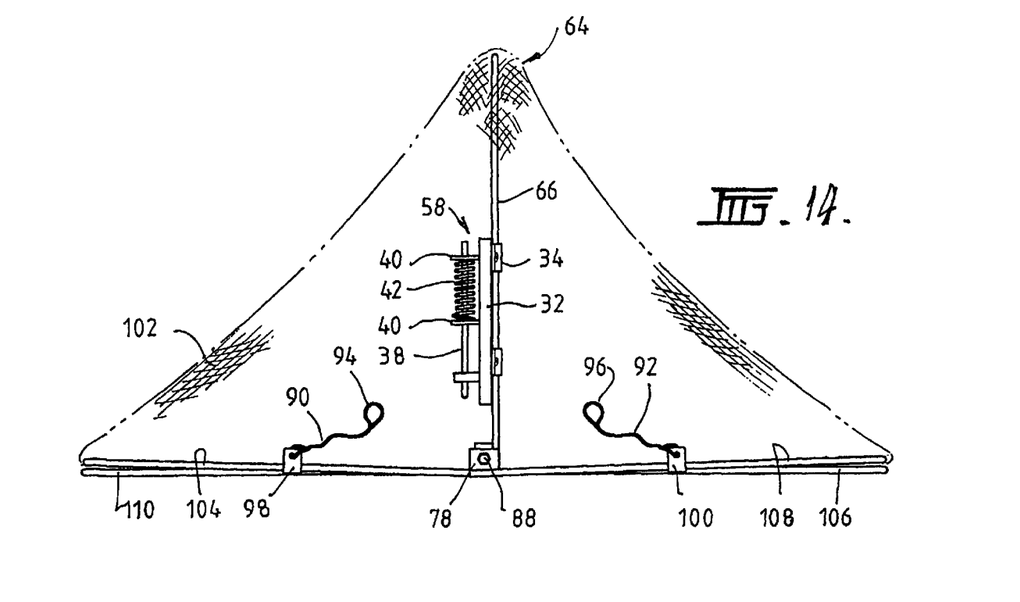
FIG. 14 is a side view of the animal trap shown in FIG. 10.

In use, release mechanism 58 will be set as previously described with reference to FIGS. 1 to 8. Half loop 66 will stand vertically as shown in FIGS. 12 and 13. The part 104 of loop 76 closest to tab 80 is raised from the ground by pivoting about bolt 88 whilst the part 106 furthest from tab 80 lies on the ground, preferably pegged (not shown) to form entrance 60. Similarly, the part 108 of loop 74 closest to tab 78 is raised from the ground by pivoting about bolt 88 whilst the part 110 furthest from tab 78 lies on the ground, preferably pegged (not shown) to form entrance 62. The parts 104, 108 will be under tension and can be held in the position shown in FIGS. 9 and 13 by placing loops 94,96 over the end of plunger 38. On tripping of release mechanism 58 the parts 104,108 of loops 76,74 l will be freed from plunger 38 causing these parts to instantly be forced to the ground under the previously held tension. The sequence of this operation is shown in phantom lines in FIG. 13. As netting 102 is attached to loops 74,76 the netting 102 will fall over animal 56 trapping the animal underneath as shown in FIG. 10. Half loop 66 will remain in the vertical position to provide more room for the trapped animal to move to cause less stress thereto.

FIGS. 15 to 19 depict a third embodiment of an animal trap made in accordance with the invention. This embodiment is a variation of the first embodiment shown in FIGS. 1 to 8 and operates in a similar manner. The release mechanism 30 and arcuate frame element 14 of FIGS. 1 to 8 have been replaced by release mechanism 120. Release mechanism 120 has a base plate 122 which is secured to the ground by peg 124. Two loops 126,128 are formed from a length of coiled rod with loop 126 being fastened to the ground with pegs 130,132 whilst loop 128 is only fastened to the ground by peg 132. One end 134 of the coiled rod extends through an inner set of eyes 136,138 on base plate 122 whilst the other end 140 forms an end of a hook 142. Hook 142 has a bend 144 which pivots about an outer eye 146 on base plate 122. Loop 128 is held to base plate 122 by an second set of eyes 148,150.

Figure 15:
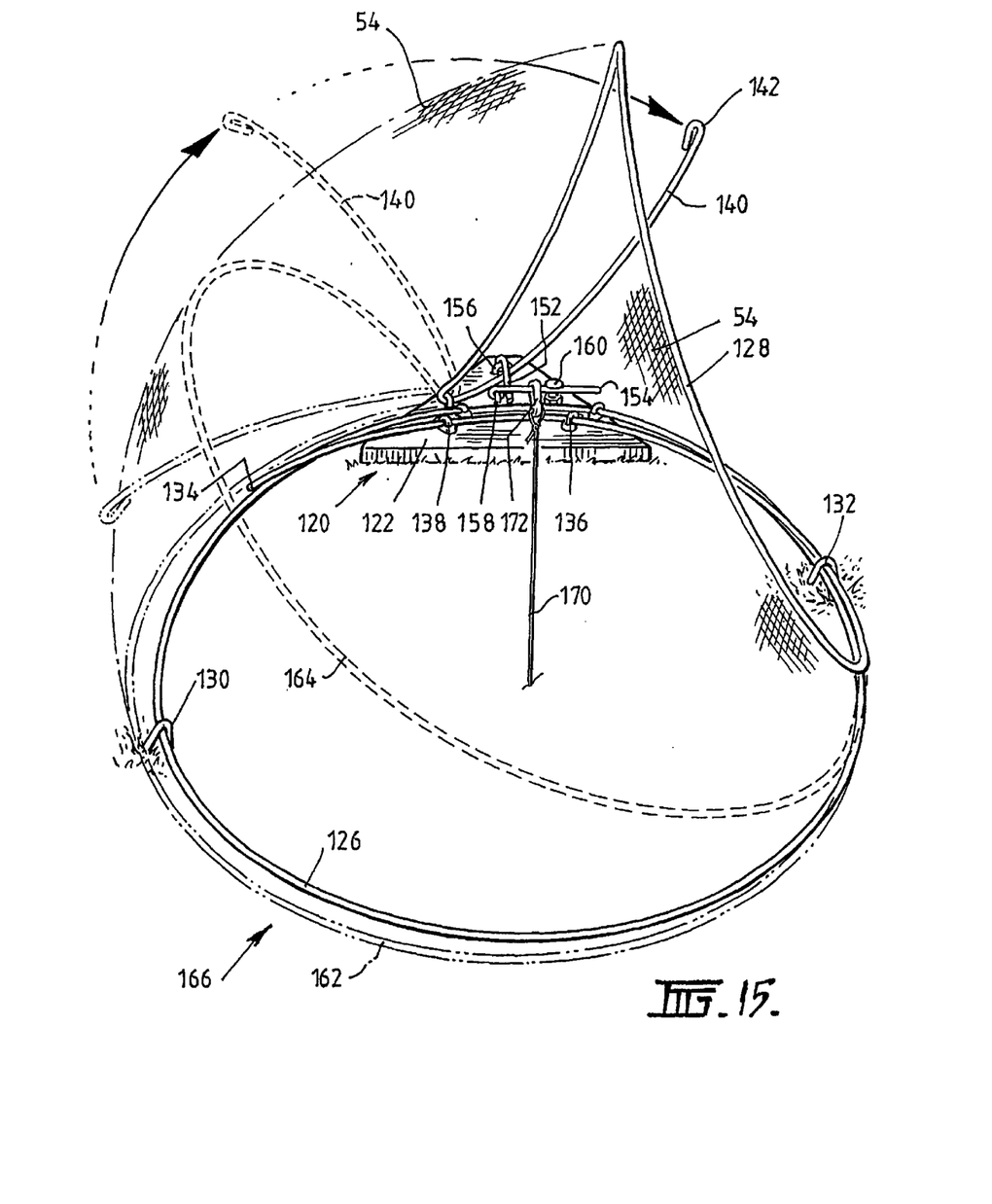
FIG. 15 is a perspective view of a third embodiment of an animal trap made in accordance with the invention with the trap being set.

To complete the release mechanism 120 a pair of trip arms 152,154 are pivotally coupled to respective eyes 156, 158 secured to base plate 122. Eyes 156,158 are at angle to one another. A stop member 160, e.g. a headed bolt, provides a stop for trip arm 154.

Figure 16:
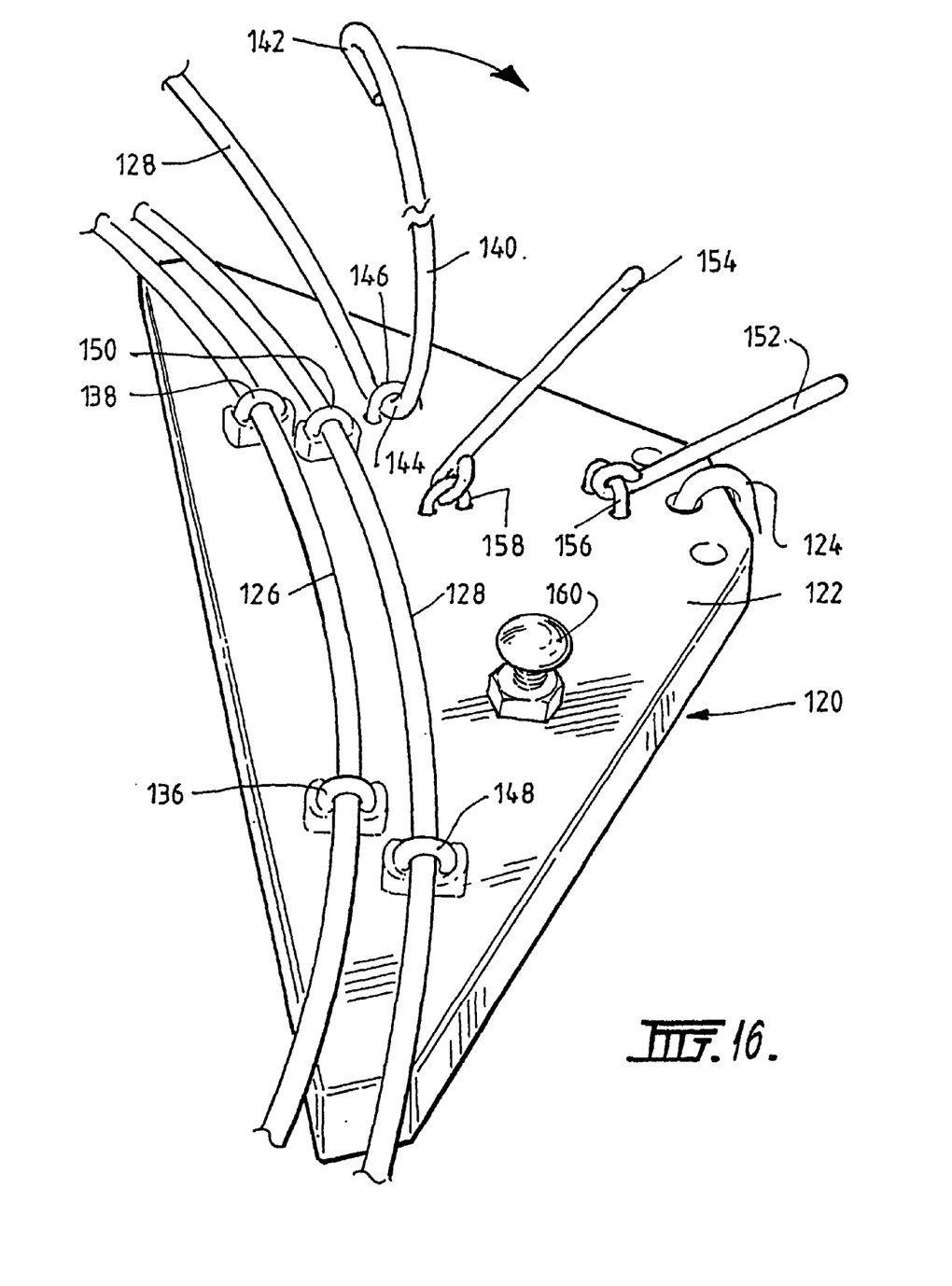
FIG. 16 is an enlarged view of the release mechanism of the trap shown in FIG. 15 in the first stage of setting the trap of FIG. 15.
Figure 17:
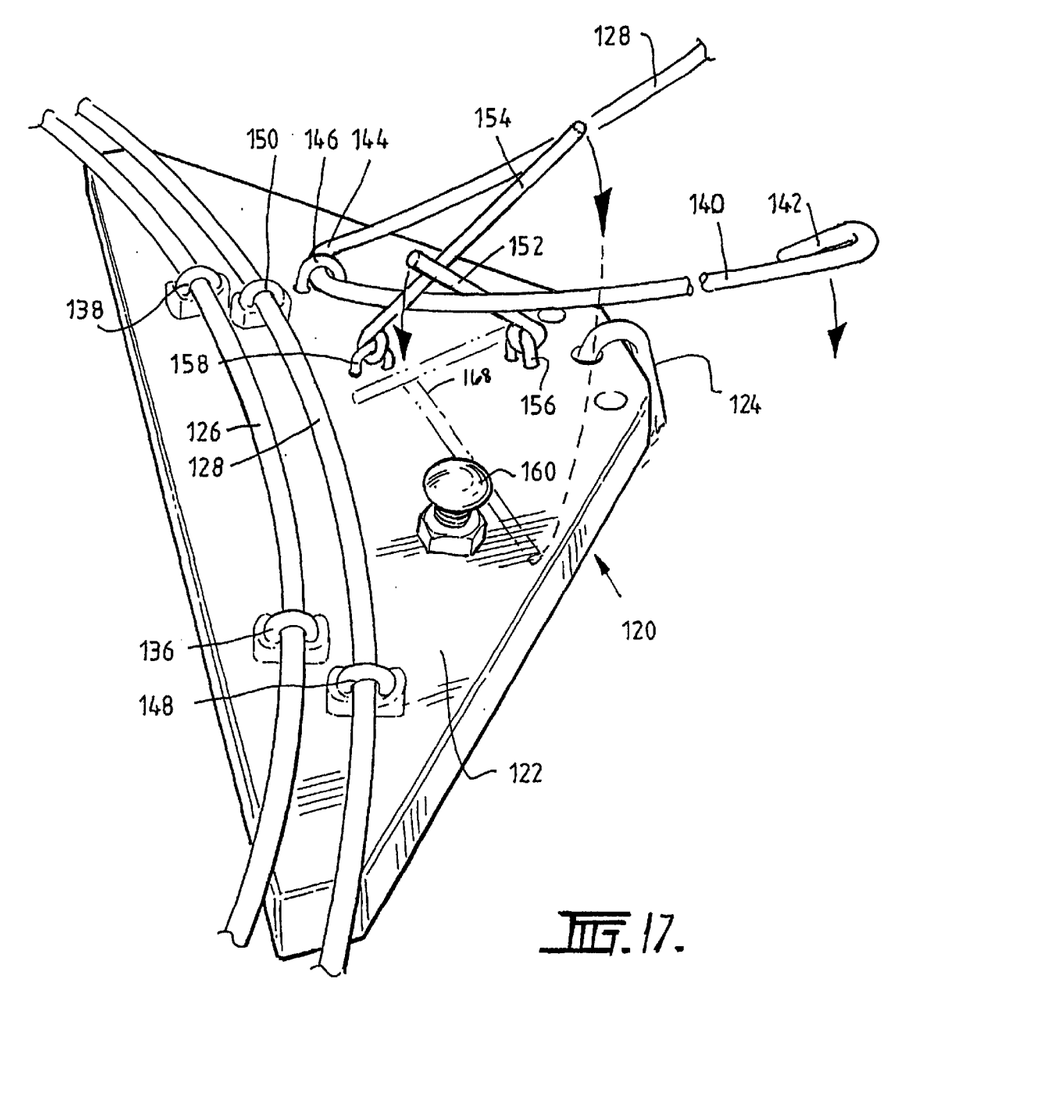
FIG. 17 is a similar view to that of FIG. 16 showing a second stage of setting the trap of FIG. 15.
Figure 18:
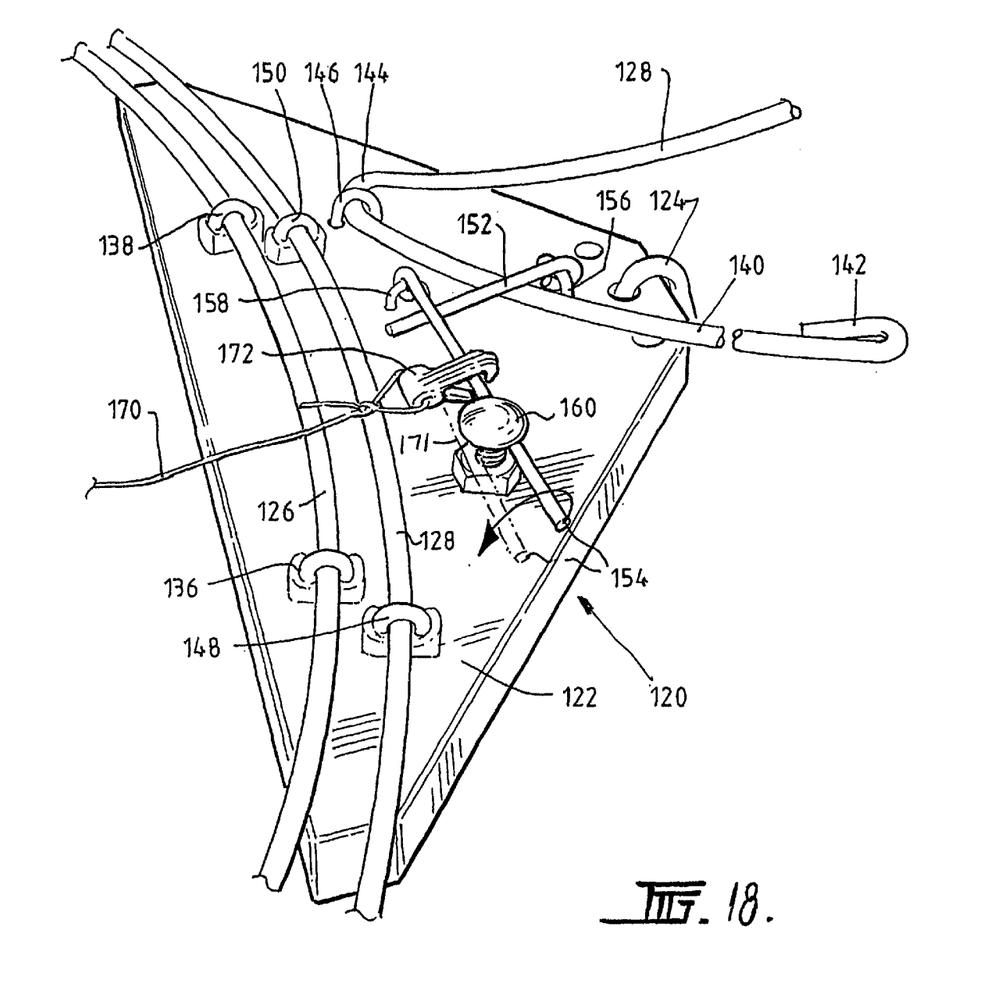
FIG. 18 is a similar view to that of FIG. 16 showing a third stage of setting the trap of FIG. 15.
Figure 19:
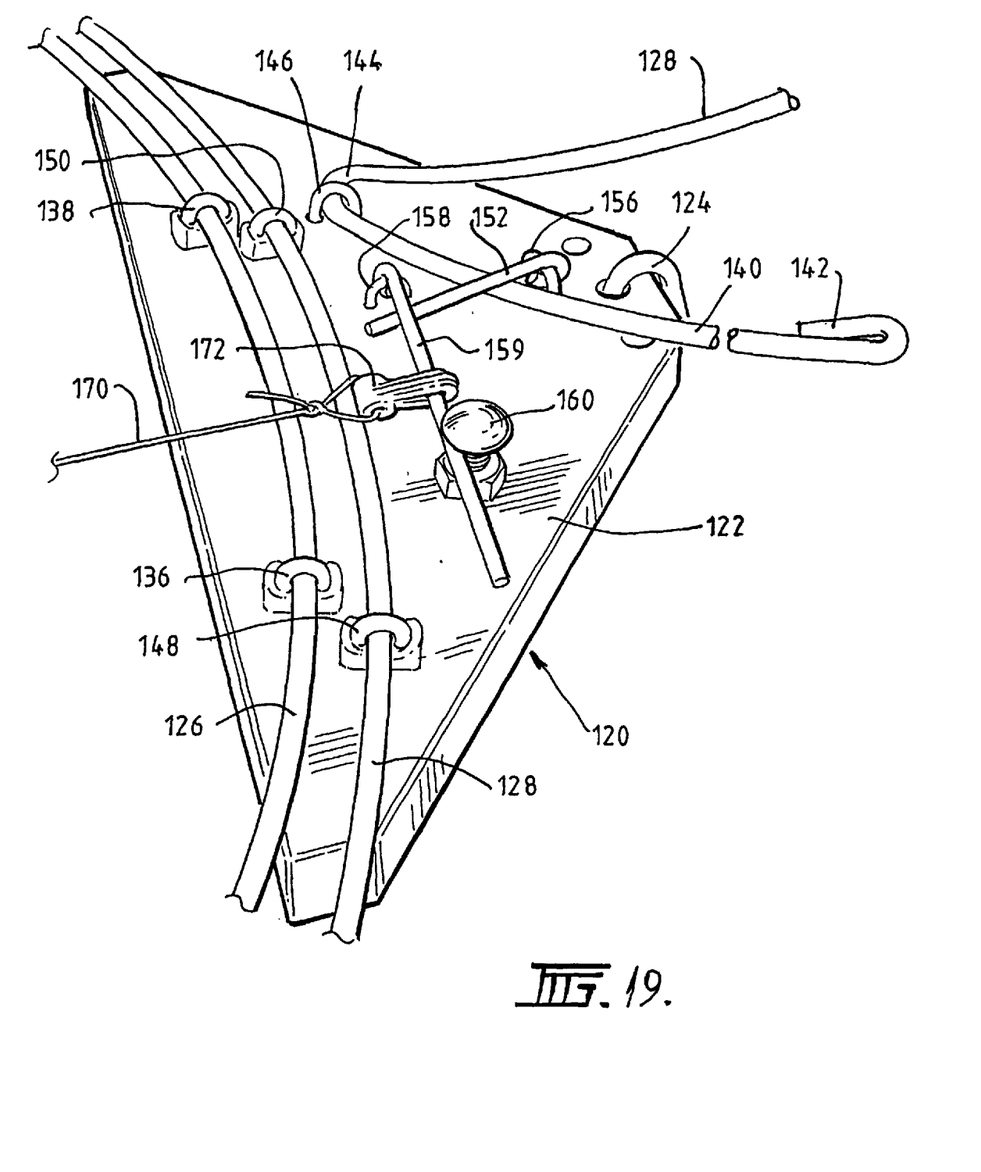
FIG. 19 is a similar view to that of FIG. 16 showing the set position of the trap of FIG. 15.

In use, loop 128 will have netting 54 attached thereto. Loops 126,128 will rest on the ground in the released state as indicated by phantom lines 162 (FIG. 15). Loop 126 will be fastened to the ground by pegs 130,132 whilst loop 128 will only be fastened to the ground by peg 132 to provide a pivot point. Base plate 122 will also be secured to the ground by peg 124. A part of loop 128 will be raised from the ground to the initial position shown by phantom lines 164 to the full position shown in FIG. 15 by pulling on hook 142 or loop 128 itself. Loop 128 will be under tension and must be held by release mechanism 120 in this raised position. Netting 54 will be lifted up with loop 128 to provide an entrance to the trap from the front 166 thereof. Hook 142 is latched to base plate 122 in the operation sequence shown in FIGS. 16 to 19. In FIG. 16 trip arms 152,154 have not been set. Hook 142 is positioned under trip arm 152 whilst trip arm 154 is positioned over trip arm 152 as shown in FIG. 17. Trip arms 152,154 together with hook 142 are moved in the direction of the arrows to the position shown in phantom lines at 168. A trip cord 170 is then fitted to release mechanism 120 (FIG. 18 ). Trip cord 170 has a hook 172 at one end for engaging with trip arm 154 and a bait (not shown) at the other end. Trip arm 154 is then shifted to the position shown in phantom lines 171 (FIG. 18 ) to the set position in FIG. 19. Trip arm 154 will be locked under the head of stop member 160 under tension from trip arm 152 and hook 142. When animal 56 takes the bait, trip cord 170 will pull on hook 172 to displace trip arm 154 and release trip arm 152. Trip arm 152 will be assisted in its release by the tension from hook 142. Once hook 142 is released, loop 128, with its pivotal connection to eye 146, will be immediately pulled to the ground to cover the animal with netting 54 and trap the animal.

The invention is not restricted to the type of release mechanisms 30,58,120 depicted in the preferred embodiments as other mechanisms can readily be substituted e.g. solenoid or other trigger mechanisms. Infrared or other wireless trip devices can also be used. Similarly, cables 48,90,92 could be substituted by other means e.g. solenoids or other forms of latching device. By using the release mechanism shown in FIGS. 15 to 19 the need for cables 48,90,92 is avoided. Although the preferred embodiments relate to animal traps the invention has equal applicability to birds and reptiles and any type of living being requiring capture.

The invention will be understood to embrace many further modifications as will be readily apparent to persons skilled in the art and which will be deemed to reside within the broad scope and ambit of the invention, there having been set forth herein only the broad nature of the invention and a certain specific embodiments by way of example.

The claims defining the invention are as follows:

1. An animal trap including a base member for providing contact of said trap with the ground, a frame member pivotally attached to said base member, and a release mechanism for holding, in use, said frame member under tension above the ground and netting attached to said frame member such that when said release mechanism is tripped by an animal entering said trap, said frame member pulls said netting over said animal as said frame member falls to the ground when said tension is released, wherein a coiled rod forms a pair of substantially co-axial loops such that one of the pair of loops forms said base member and the other of said pair of loops forms said frame member, and wherein movement of said frame member away from said base member tensions said rod.

2. The animal trap of claim 1, wherein said rod includes two free ends, and wherein the two free ends of said rod are adjacent each other.

3. The animal trap of claim 2, wherein one of said two free ends is pivotally attached to a frame element secured to said one of the pair of loops and the other of said two free ends is secured to said frame element.

4. The animal trap of claim 1, further including a base plate which is secured to the ground, said base plate including retaining means for attaching thereto said pair of loops and said two free ends of said rod.

5. The animal trap of claim 4, wherein said rod includes a hook portion which is pivotally attached to said base plate at the bend of said hook portion.

6. The animal trap of claim 5, wherein said hook portion is held by said release mechanism when said trap is set.

7. The animal trap of claim 1, wherein a cord is coupled to said release mechanism at one end, and a a bait is coupled to the other end of said cord.

8. The animal trap of claim 1, wherein said frame member is, in use, staked to the ground.

* * * * *